W. C. RUSSELL.
METHOD OF AND MEANS FOR INCREASING THE OUTPUT OF POWER OF ENGINES OF AIRCRAFT.
APPLICATION FILED MAR. 16, 1920.
1,364,810.
Patented Jan. 4, 1921.
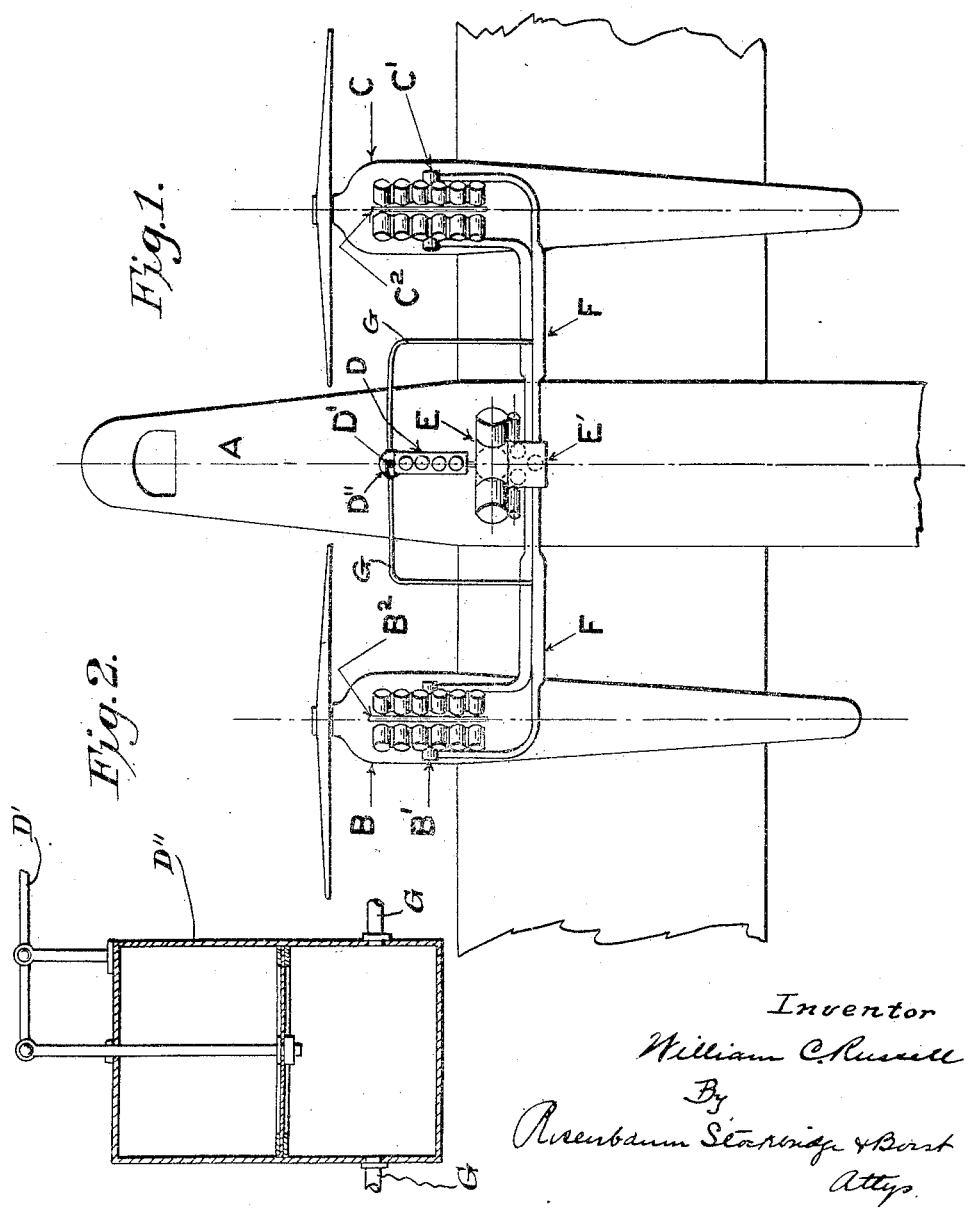
Inventor
William C. Russell
By
Rosenbaum Stockbridge & Borst
Attys.

UNITED STATES PATENT OFFICE.

WILLIAM COLIN RUSSELL, OF EAST SHEEN, SURREY, ENGLAND.

METHOD OF AND MEANS FOR INCREASING THE OUTPUT OF POWER OF ENGINES OF AIRCRAFT.

1,364,810. Specification of Letters Patent. Patented Jan. 4, 1921.

Application filed March 16, 1920. Serial No. 366,455.

*To all whom it may concern:*

Be it known that I, WILLIAM COLIN RUSSELL, a subject of the King of Great Britain, residing at 63 Palewell Park, East Sheen, in the county of Surrey, England, have invented certain new and useful Improvements in Methods of and Means for Increasing the Output of Power of Engines of Aircraft, of which the following is a specification, reference being had therein to the accompanying drawings.

This invention relates to improvements in the arrangement and operation of means for supercharging the combustion engines of aircraft to a pressure of induction higher than atmospheric pressure, particularly at high altitudes above sea level, with special reference to the requirements of multi-engined aircraft.

My invention has for its object the provision of means whereby a number of engines upon an aircraft may be supercharged collectively under a single automatic or hand operated control, permitting the pressure and volume of the supercharging air to be regulated to suit the particular number of engines in use at any moment, be it but one. Further, to provide in conjunction means whereby any one or all the said engines may be started up either on the ground or during flight whenever required.

In systems of supercharging difficulty arises in adjusting the pressure and volume of the compressed air with precision and steadiness, especially with centrifugal pumping appliances. Further, in obtaining the lowest expenditure of power in supercharging the compression of air against a constant pressure head can be avoided by employing a pump of the type having reciprocating pistons.

In my invention I provide upon a multi-engined aircraft appliances to effect supercharging embodying the following features:—

Each of the engines upon the aircraft may be of a standard non-supercharged type requiring only the special adaptation of the carbureter air intake and petrol feed system to suit the induction of compressed air through the carbureter, and each is connected by piping passages or the like to an air compressor unit.

In a conveniently central position for the supply of compressed air to the said engines I mount a pumping unit in which is embodied a pump of the reciprocating pistons type and wherein the process of air compression is divided into separate induction and compression strokes (*i. e.* induction and compression is not performed continuously in one operation as in rotary or centrifugal pumps).

For the driving of the said air compressing pump I provide an internal combustion engine which may be placed adjacent to and in driving connection with it, or the said pump and engine may be constructed together as one unit. The relative dimensions of the said pump and engine are arranged so that at their maximum working speed they can supercharge all the engines supplied by them, and also the supercharger engine itself if desired to a certain maximum pressure above atmospheric pressure.

In a reciprocating piston type of pump the volume of air passing through the pump varies approximately directly as the speed of pumping. The volume of air induced by the aircraft engines is a similarly definite quantity. If, therefore, the pump be caused to relatively overrun the engines supercharged the pressure in the compressed air delivery piping automatically rises until the weight of air delivered by the pump is compressed into the bulk the supercharged engines can receive in given time.

Regulation of supercharging pressure is effected in my invention by opening out or closing down the throttle or other speed and power control fitted to the said pumping engine either by hand in conjunction with a gage registering the pressure within the compressed air delivery system, or automatically by a vacuum box or the like placed in contact with the compressed air for supercharging and expanding or contracting to agree with the "absolute" air pressure, expansion or contraction beyond a set point adjustable at will causing adjustment of the speed and power control device fitted to the said pumping engine. I do not limit myself to any particular form of mechanism for conveying the motion of the vacuum box to the throttle lever or other speed and power control of the pumping engine.

As in other systems of supercharging I may provide in the compressed air delivery system a radiator for cooling the compressed air, also a safety blow off valve, or cock and an inlet valve or cock to admit air for induction into the aircraft engines when the pumping unit is out of action; also means for equalizing air pressure in carbureter float chamber and gravity feed fuel tanks.

In order to enable the aforesaid supercharging means to be employed for the purpose of self-starting the aircraft engines by hand operated magneto machine or the like, I may provide in combination with the independent pumping unit above described, gearing for lifting the inlet and exhaust valves of the aircraft engines whereby compressed air supplied by the said pumping unit and passing through the carbureters will prime the cylinders ready for ignition by the said hand magneto machine. I do not confine myself to any particular type of gearing for lifting the valves of the aircraft engines as aforementioned there being a number of such mechanisms in current use in combination with hand pump primers.

In the accompanying drawings:

Figure 1 is a diagrammatic illustration of the application of the invention to a twin engined aircraft; and Fig. 2 is a detailed view showing diagrammatically the connection between a vacuum box and the pumping engine.

The drawings illustrate the application of the general arrangement proposed, A indicating the main fuselage and B and C the engine nacelles of a twin engined aircraft. Within the main fuselage A is mounted the combustion engine D driving the reciprocating piston type of pump E (here indicated as having 3 radially disposed cylinders with piston valves) upon which is formed a compressed air reservoir $E^1$ from which the compressed air for supercharging is conveyed by the pipes F to the carbureters $B^1$ $C^1$ of the said twin aircraft engines B and C. Built with the camshaft of each engine is the valve lifting mechanism $B^2$ $C^2$ by which all the valves of the said engines may be lifted for cylinder priming by forced induction. The pumping engine D has a speed and power control lever $D^1$ for the regulation of pumping either by hand or by automatic control by means of a vacuum box $D''$.

In Fig. 2 the vacuum box $D''$ is shown as having therein a diaphragm forming a lower chamber which is in communication with the pipes F by means of conduits G. The engine control lever $D'$ is connected to the diaphragm, and it will be obvious that variations in the pressure within the pipes F will influence the diaphragm and thus result in a regulation of the control lever $D'$.

I claim:—

1. In an aircraft having a driving engine and a supercharging system comprising a pump, a conduit leading from said pump and communicating with the induction of the engine whereby air compressed by the pump may be conducted to the engine, a prime mover operable independently of said engine for operating said pump, and means responsive to variations in the pressure of the air in said conduit to control the speed of the pump.

2. In an aircraft having a driving engine and a supercharging system comprising a pump, a conduit leading from said pump and communicating with the induction of the engine whereby air compressed by the pump may be conducted to the engine, a prime mover operable independently of said engine for operating said pump, and means responsive to variations in the pressure of the air in said conduit and operable independently of the speed variations of the aircraft engine to control the speed of the pump.

3. In an aircraft having a driving engine and a supercharging system comprising a pump, a conduit leading from said pump and communicating with the induction of the engine whereby air compressed by the pump may be conducted to the engine, a prime mover operable independently of said engine for operating said pump, and means responsive to variations in the pressure of the air in said conduit to control the speed of the pump operating prime mover.

4. In an aircraft having a driving engine and a supercharging system comprising a pump, a conduit leading from said pump and communicating with the induction of the engine whereby air compressed by the pump may be conducted to the engine, a prime mover operable independently of said engine for operating said pump, and a vacuum box adapted to be expanded and contracted in accordance with variations in the pressure of the air in said conduit to control the speed of the pump.

5. In an aircraft having a driving engine and a supercharging system comprising a pump, a conduit leading from said pump and communicating with the induction of the engine whereby air compressed by the pump may be conducted to the engine, a prime mover operable independently of said engine for operating said pump, and a vacuum box in operative relation to said prime mover and adapted to be contracted and expanded in accordance with variations in the pressure of the air in said conduit to control the speed of said prime mover.

WILLIAM COLIN RUSSELL.

Witnesses:
A. E. BROUNGER,
J. B. RISHMAN.